United States Patent
Körte

(10) Patent No.: US 6,764,524 B1
(45) Date of Patent: Jul. 20, 2004

(54) 1:2 CHROMIUM COMPLEX DYES, THEIR PRODUCTION AND USE

(75) Inventor: Klaus Körte, Ettingen (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/675,340

(22) PCT Filed: Aug. 12, 1999

(86) PCT No.: PCT/IB99/01427

§ 371 (c)(1),
(2), (4) Date: Sep. 28, 2000

(87) PCT Pub. No.: WO00/09615

PCT Pub. Date: Feb. 24, 2000

(30) Foreign Application Priority Data

Aug. 14, 1998 (EP) ............................................. 98810778

(51) Int. Cl.⁷ .............................................. C09B 45/16
(52) U.S. Cl. ................... 8/522; 8/685; 8/687; 534/696; 534/721; 534/723; 534/725; 534/692
(58) Field of Search ........................... 8/522, 527, 685, 8/687; 534/696, 721, 723, 725, 692

(56) References Cited

U.S. PATENT DOCUMENTS

| | | | |
|---|---|---|---|
| 4,469,485 A | 9/1984 | Grossmann | 8/522 |
| 4,531,979 A | 7/1985 | Bohler et al. | 148/6.27 |
| 4,618,673 A | 10/1986 | Dore | 534/698 |
| 4,710,198 A | * 12/1987 | Beffa et al. | |
| 4,820,309 A | 4/1989 | Holliger | 8/437 |
| 5,008,379 A | 4/1991 | Holliger | 534/684 |
| 5,123,930 A | 6/1992 | Bitterli | 8/522 |
| 5,283,325 A | 2/1994 | Bitterli | 534/721 |
| 5,401,834 A | * 3/1995 | Koerte | |
| 5,853,431 A | * 12/1998 | Korte | |
| 6,210,448 B1 | 4/2001 | Korte | 8/522 |

FOREIGN PATENT DOCUMENTS

| | | |
|---|---|---|
| DE | 33 27 191 | 2/1984 |
| DE | 35 44 118 | 6/1986 |
| GB | 2 268 183 | 1/1994 |
| WO | WO 97/32933 | 9/1997 |

OTHER PUBLICATIONS

Ullmann's "Enzyklopadie der Technischen Chemie" [Encylopedia of Industrial Chemistry], 4th Edition, vol. 12, pp. 196–198; 1972.

Sandoz brochure "Sanodal®" (Sandoz AG, Basel, Switzerland, Publication No. 9083.00.89; 1989.

Guide to the adsorptive dyeing of anodized aluminium, Sandoz Publication No. 9122.00.80; 1980.

English abstract for JP 55097492, Jul. 24, 1980.

* cited by examiner

Primary Examiner—Margaret Einsmann
(74) Attorney, Agent, or Firm—Anthony A. Bisulca

(57) ABSTRACT

Asymmetrical 1:2 chromium complex dyes of formula (I), wherein X signifies $-SO_3M$, $-SO_2NR_1R_2$ or chlorine, Y signifies hydrogen, $-SO_3M$ or chlorine, $R_1$ signifies hydrogen, $C_{1-6}$alkyl, $C_{2-3}$-hydroxyalkyl or a radical of formulae (a) or (b), $R_2$ signifies hydrogen, $C_{1-6}$alkyl or $C_{2-3}$-hydroxyalkyl, or $R_1$ and $R_2$ together with the nitrogen atom to which they are attached, form a 5- or 6-membered saturated heterocycle, $R_3$ signifies hydrogen, $C_{1-2}$-alkyl, chlorine, $-COOM$ or $-SO_3M$, $R_4$ signifies hydrogen, $C_{1-2}$-alkyl, $C_{1-2}$-alkoxy chlorine or $-SO_3M$, n signifies from 0 to 3, M signifies in each case hydrogen or a nonhromophoric cation, and M⁺ signifies hydrogen or a nonchromophoric cation, are useful for dyeing artificially produced oxide layers on aluminium or aluminium alloys, on which they produce grey dyeings in high color yield and hue reproducibility

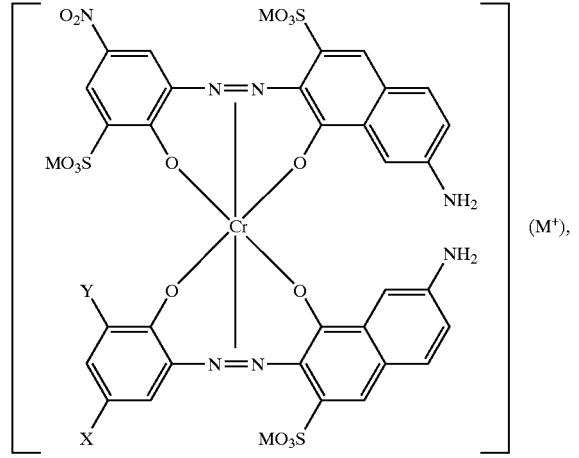

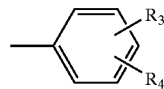

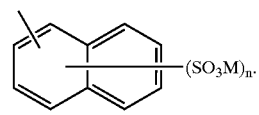

11 Claims, No Drawings

1:2 CHROMIUM COMPLEX DYES, THEIR PRODUCTION AND USE

BACKGROUND OF THE INVENTION

Aluminium and aluminium alloy structures, articles and parts which have been provided with a protective oxide layer, especially with an oxide layer produced electrochemically by anodization, are nowadays increasingly used in engineering and building construction, for example as constituting or/and decorative components of buildings and means of private or public transport, or for utility or art objects. A popular way of improving the aesthetic appeal of such structures, articles and parts is to colour them or respectively their oxide layers. It is accordingly desirable that the coloured layers should retain their colour for as long as possible and consequently have very high fastnesses to environmental influences, especially to the action of sunlight. To fit in with the colour of the immediate surroundings, for example other structural components, which are e.g. white to grey or even black, or to create a contrast to parts in other, intensive or luminous colours, or else to emulate the self-colour of the metal, it is frequently desirable to confer a grey colour on such oxide layers. However, it is difficult to create a truly neutral grey shade, especially of a high hue constancy over various dyeing stages. For instance, when a black dye (e.g. such as described in GB-A-2268183 or JP-A-55-97429) is used in dilute form, an undesirable secondary hue of the black dye, for example green, reddish or blue, may become apparent, so that the grey produced is not neutral. There has been many an attempt to produce a truly neutral grey, for example as textile dyes. However, the dyeing and fastness requirements of dyeings on the abovementioned oxide layers and the requirements of the bath durability of the dyes are much higher than and in part also significantly different from those relating to textiles, so that a neutral grey in a fastness level which is suitable for the abovementioned substrates and in a suitable hue constancy and bath durability remains an hitherto unmet want of the market.

SUMMARY OF THE INVENTION

It has now surprisingly been found that the hereinbelow defined asymmetrical 1:2 chromium complex dyes are outstandingly suitable as grey dyes of a very neutral grey hue for such oxide layers, especially for anodized aluminium and anodized aluminium alloys, and are notable in this use for their surprisingly high fastnesses and bath durability.

DESCRIPTION OF THE PREFERRED EMBODIMENTS

The invention concerns the defined asymmetrical 1:2 chromium complex dyes, their production and their use, in particular for dyeing artificially (chiefly galvanically) produced oxide layers on aluminium or aluminium alloys and to compositions containing these dyes. The invention also concerns a dye composition having at least one asymmetrical 1:2 chromium complex dye.

In a first aspect, the invention accordingly provides asymmetrical 1:2 chromium complex dyes of the formula

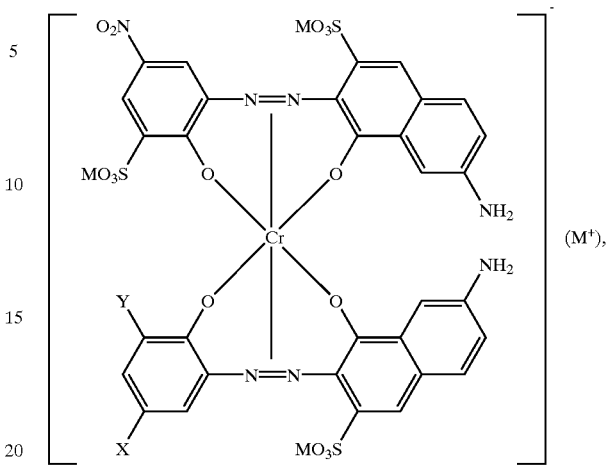

wherein
X signifies —$SO_3M$, —$SO_2NR_1R_2$ or chlorine,
Y signifies hydrogen, —$SO_3M$ or chlorine,
$R_1$ signifies hydrogen, $C_{1-6}$-alkyl, $C_{2-3}$-hydroxyalkyl or a radical of the formula

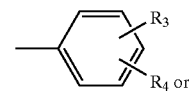

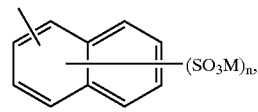

$R_2$ signifies hydrogen, $C_{1-6}$alkyl or $C_{2-3}$-hydroxyalkyl, or $R_1$ and R2 together with the nitrogen atom to which they are attached form a 5- or 6-membered saturated heterocycle,
$R_3$ signifies hydrogen, $C_{1-2}$-alkyl, chlorine, —COOM or —$SO_3M$,
$R_4$ signifies hydrogen, $C_{1-2}$-alkyl, $C_{1-2}$-alkoxy, chlorine or —$SO_3M$,
n signifies from 0 to 3,
M signifies in each case hydrogen or a non-chromophoric cation, and $M^+$ signifies hydrogen or a non-chromophoric cation.

The alkyl radicals occurring in the formula (I) may be linear or, if they contain three or more carbon atoms, may also be branched, or, if they contain six carbon atoms, may also be cyclic. Among the alkyl radicals the lower-molecular ones are preferred, in particular ethyl and especially methyl.

In the radicals of the formula (a) the respective substituents may be located in any desired positions on the phenyl radical; if $R_3$ stands for a sulpho group —$SO_3M$, this group is preferably located in meta position or para position; if $R_3$ stands for a carboxyl group —COOM, this group is preferably located in ortho position or para position; if $R_3$ stands for alkyl or chlorine or/and if $R_4$ is alkyl, alkoxy or chlorine, these substituents may be located in any of the available positions, with preferably at least one of the two ortho positions on the phenyl radical being unsubstituted. $R_3$ signifies particularly preferably hydrogen or —COOM. $R_4$ signifies particularly preferably hydrogen.

The free bond on the sulpho-substituted naphthalene radical (b) may be located arbitrarily in α or β position, the α position being preferred. For n=1 to 3 the n sulpho groups in the formula (b) may be located in n arbitrary available positions, with preferably the vicinal positions to the bond to N being unsubstituted. Mention may be made in particular of α-naphthyl and the following naphthylsulphonic acid radicals of the formula (b): 2-naphthyl4,6,8-trisulphonic acid, 1-naphthyl-3,6-disulphonic acid, 1-naphthyl-3,7-disulphonic acid, 1-naphthyl4,6-disulphonic acid, 1-naphthyl4,7-disulphonic acid, 2-naphthyl4,8-disulphonic acid, 2-naphthyl-5,7-disulphonic acid, 2-naphthyl-6,8-disulphonic acid, 1-naphthyl-3-, -4-, -5-, -6- or -7-sulphonic acid and 2-naphthyl-5- or -6-sulphonic acid. Among these radicals, preference is given to those in which n=1, especially 1-naphthyl4- or -5-sulphonic acid.

Y signifies advantageously hydrogen, chlorine or —$SO_3M$, preferably hydrogen. X preferably signifies —$SO_2NR_1R_2$. When one of the two symbols X and Y signifies chlorine, the other one signifies preferably a sulpho group. When X stands for —$SO_2NR_1R_2$, Y signifies preferably hydrogen. $R_1$ stands preferably for $R_1'$, i.e. hydrogen, $C_{1-2}$-alkyl or a radical of the formula (a), particularly preferably hydrogen, phenyl or carboxyphenyl. $R_2$ signifies advantageously $R_2'$, i.e. hydrogen or $C_{1-2}$-alkyl, preferably hydrogen. X signifies particularly preferably —$SO_2NR_1'R_2'$.

The sulphonic and carboxylic acid groups may be in the form of the free acid or, preferably, in the form of salts of non-chromophoric cations.

M and $M^+$ may each signify hydrogen or a non-chromophoric cation. Hydrogen as ion is present as the hydronium ion. Examples of suitable non-chromophoric cations are alkali metal cations, ammonium cations and alkaline earth metal cations. As alkaline earth metal cations mention may be made, for example, of calcium and magnesium. As ammonium cations mention may be made of unsubstituted ammonium or also ammonium ions of low-molecular amines, chiefly mono-, di- or tri-$C_{1-2}$-alkyl-and/or -β-hydroxy-$C_{2-3}$-alkyl-ammonium, e.g. mono-, di- or tri-isopropanolammonium, mono-, di- or triethanolammonium and N-methyl-N-ethanol-ammonium. Suitable alkali metal cations are customary such cations, e.g. lithium, sodium and/or potassium ions. Among the mentioned cations the alkali metal cations and ammonium cations are preferred. In one embodiment of the invention some of the symbols M and $M^+$ signify hydrogen and the rest of them signify alkali metal cations and/or ammonium cations.

Preferred asymmetrical 1:2 chromium complex dyes of the formula (I) conform to the formula

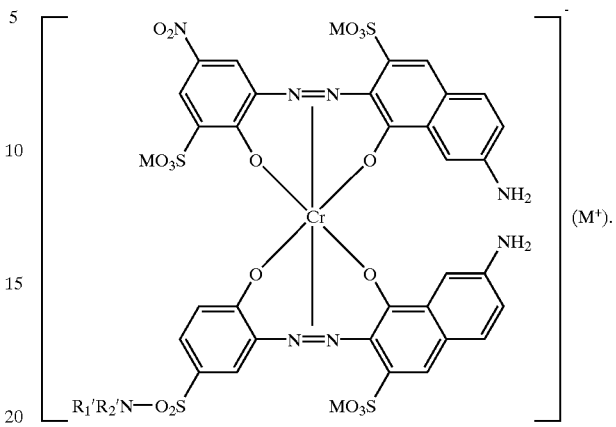

The 1:2 chromium complex dyes of the formula (I) may be produced in analogy to chromation reactions which are known per se. In particular, the process for the production of the 1:2 chromium complex dyes of the formula (I) is characterized in that a 1:1 chromium complex of a monoazo compound of the formula

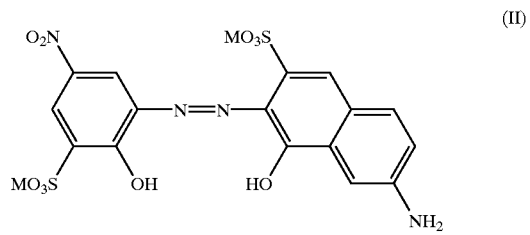

is reacted with a metallizable compound of the formula

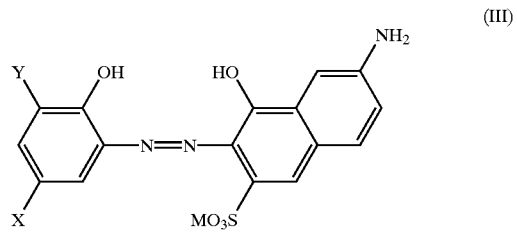

or a 1:1 chromium complex of a monoazo compound of the formula (III) is reacted with a metallizable compound of the formula (II).

The compounds of the formulae (II) and (III) are known or may be produced in analogy to known methods, especially by coupling the diazo compound of 2-amino-1- hydroxybenzene-4-nitro-6-sulphonic acid, or respectively of an amine of the formula

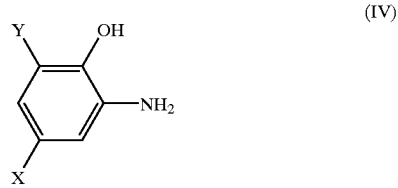

(IV)

onto a coupling component of the formula

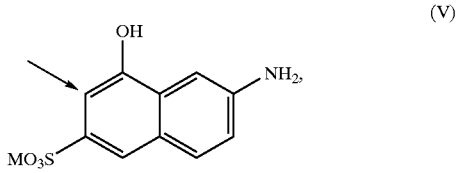

(V)

i.e. γ-acid or a salt thereof.

The diazotization of 2-amino-1-hydroxybenzene4-nitro-6-sulphonic acid or of a compound of the formula (IV) may be carried out in a manner known per se, in particular with sodium nitrite in an acidic medium (preferably at pH 1 to 3) and at a low temperature, preferably within the range from −5 to +15° C. The coupling of the diazonium compound onto a coupling component of the formula (V) may be carried out in a manner known per se, advantageously at temperatures within the range from −5 to +30° C., preferably below 25° C., particularly preferably within the range from 0 to 10° C., and under distinctly alkaline conditions, advantageously within the pH range from 8 to 12, preferably 9 to 11. The reactions may be carried out in an aqueous medium or also in an aqueous/organic medium, in which case the organic medium is preferably a water-miscible inert solvent (e.g. an alcohol or dioxane).

To chrome the compounds of the formula (II) or (III) to give corresponding 1:1 chromium complexes, suitable chromium compounds which are customary per se may be employed as are employed for preparing chromium complexes, for example chromium hydroxide or water-soluble salts of low molecular weight carboxylic acids or mineral acids, especially chromium trichloride, chromium trifluoride, chromic sulphate, chromic formate, chromic acetate, potassium chromic sulphate, ammonium chromic sulphate (e.g. chrome alums) and optionally, with the addition of a reducing agent, for example glucose, also sodium or potassium chromate or bichromate.

The chromation to the 1:1 chromium complexes may be carried out in an aqueous medium, preferably at distinctly acidic pH values, advantageously at pH <3, and at temperatures within the range from 95 to 130° C., if necessary under pressure. The reaction may if desired be carried out with the addition of organic solvents or even in organic solvents only. Suitable organic solvents are preferably those which are miscible with water and have a boiling point above 100° C. and in which the azo dyes and their metal salts are soluble, for example glycols, ether alcohols or amides (e.g. ethylene glycol, poly-ethylene glycols, β-methoxyethanol, β-ethoxyethanol, formamide or dimethylformamide). The pH may be set with acids customary per se, for example with mineral acids (chiefly hydrochloric acid, sulphuric acid or phosphoric acid) and/or with low molecular weight aliphatic carboxylic acids (having for example 1 to 4 carbon atoms, e.g. formic acid or acetic acid), in which case one particular embodiment of the process comprises using a complexing acid, for example an aliphatic dicarboxylic acid, an aliphatic α- or β-hydroxycarboxylic acid or an aromatic o-hydroxycarboxylic acid (for example having 2 to 8 carbon atoms, e.g. oxalic acid, citric acid, lactic acid, tartaric acid, malic acid, glycolic acid, unsubstituted salicylic acid or methyl-substituted salicylic acid) as a labile chelant. The 1:2 chromium complexes are then advantageously prepared at pH values in the range from 3 to 10, preferably 4 to 9.

After completion of the requisite diazotization, coupling, chromation to form the 1:1 Cr complex and complexation to form the asymmetrical 1:2 Cr complex and, if required, salt formation or ion exchange to introduce cations M or $M^+$, the dyes or dye mixtures obtained may be isolated from the mother liquor in a manner known per se, for example by salting out or acidifying out with a strong mineral acid and filtration, or, for example, by membrane filtration of the dye solution (either of the assynthesized dye solution or also of a solution of the filtered dye), and if desired drying (e.g. by spray drying) of the dye solution, optionally desalinated by membrane filtration. If desired, the dye may be blended with a customary blending agent known per se, for example with non-electrolyte-type blending agents; the dye which has been desalinated by membrane filtration may if desired be blended with non-electrolyte-type blending agents (chiefly urea or/and oligosaccharides, for example dextrins) before or after drying (spray drying, for example). If desired, the dyes may be admixed with anionic surfactants, especially hydrocarbonsulphonates or other organic sulphonates, for example sulphonated castor oil. sulphosuccinates or lignin-sulphonates. When a surfactant is used, the weight ratio of the surfactant to the pure dye is advantageously within the range 2:98 to 10:90. For liquid formulations, the dyes, advantageously in desalinated form and without blending agent addition, are prepared as concentrated solutions in which the dye content is advantageously within the range from 5 to 35 per cent by weight, preferably 10 to 25 per cent by weight, based on the weight of the product. An additive to control the harmful effect of microorganisms may optionally be added (e.g. an agent which kills the microorganisms, i.e. a biocide or microbicide, or which inhibits their growth, i.e. chiefly a bacteriostatic, fungistatic or/and yeastistatic additive), for example in concentrations of 0.001 to 1% by weight based on the total liquid formulation.

The dyes of the formula (I), in particular in the form of their salts, especially alkali metal salts and/or ammonium salts, are very highly soluble in water and, in dry form or also in the form of even their concentrated solutions, are very stable on storage and transportation. They are used as anionic dyes, in particular for dyeing artificially produced oxide layers on aluminium or aluminium alloys.

Suitable aluminium alloys include primarily those in which the aluminium component is preponderant, especially alloys with magnesium, silicon, zinc and/or copper, e.g. Al/Mg, Al/Si, Al/Mg/Si, Al/Zn/Mg, Al/Cu/Mg and Al/Zn/Mg/Cu, preferably those in which the aluminium content accounts for at least 90 per cent by weight; the magnesium content is preferably ≦6 per cent by weight; the silicon content is preferably ≦6 per cent by weight; the zinc content is preferably ≦10 per cent by weight; the copper content is advantageously ≦2 per cent by weight, preferably ≦0.2 per cent by weight.

The oxide layers formed on the metallic aluminium or on the aluminium alloys may have been generated by chemical oxidation or, preferably, galvanically by anodic oxidation. The anodic oxidation of the aluminium or of the aluminium alloy for passivation and formation of a porous layer may take place in accordance with known methods, using direct and/or alternating current, and using electrolyte baths that are suitable in each case, with the addition, for example, of sulphuric acid, oxalic acid, chromic acid, citric acid or combinations of oxalic acid and chromic acid or sulphuric acid and oxalic acid. Such anodizing techniques are known in the art, examples being the DS process (direct current; sulphuric acid), the DSX process (direct current; sulphuric acid with addition of oxalic acid), the DX process (direct current; oxalic acid), the DX process with addition of chromic acid, the AX process (alternating current; oxalic acid), the AX-DX process (oxalic acid; first alternating current then direct current), the AS process (alternating current; sulphuric acid) and the chromic acid process (direct current; chromic acid). The voltages lie, for example, in the range from 5 to 80 volts, preferably from 8 to 50 volts; the temperatures lie, for example, in the range from 5 to 50° C.; the current density at the anode lies, for example, in the range from 0.3 to 5 A/dm², preferably 0.5 to 4 A/dm², current densities ≦2 A/dm² being in general already suitable for producing a porous oxide layer; at higher voltages and current densities, for example, in the range from 100 to 150 volts and ≧2 A/dm², especially from 2 to 3 A/dm², and at temperatures up to 80° C., particularly hard and fine-pored oxide layers may be produced in accordance, for example, with the "Ematal" process with oxalic acid in the presence of titanium salts and zirconium salts. For the production of oxide layers which subsequently are directly dyed adsorptively with a dye of the formula (I) the voltage, in accordance with a preferred procedure and which is customary per se in practice, lies in the range from 12 to 20 volts; the current density in this case is preferably from 1 to 2 A/dm². These anodizing techniques are common knowledge in the art and are also described in detail in the technical literature: for example, in Ullmann's "Enzyklopädie der Technischen Chemie", 4th edition, volume 12, pages 196 to 198, or in the Sandoz brochures "Sanodal®" (Sandoz AG, Basle, Switzerland, publication No. 9083.00.89) or "Ratgeber fuir das Adsorptive Färben von Anodisiertem Aluminium" (Sandoz, publication No. 9122.00.80). The thickness of the porous oxide layer lies advantageously in the range from 2 to 35 μm, preferably from 2 to 25 μm. The dyes of the formula (I) are also suitable for thin oxide layers, e.g., those ≦10 μm, and for printing those which have been anodically coloured. If the anodized aluminium or the anodized aluminium alloy has been stored for a short time (e.g., 1 week or less) prior to dyeing, it is advantageous to wet and/or activate the substrate prior to dyeing, by means, for example, of treatment with a non-reductive aqueous mineral acid, for example, with sulphuric acid or nitric acid.

For dyeing the oxide layer with the dyes of the formula (I) dyeing methods conventional per se, may be used, in particular adsorption methods, where the dye solution may e.g. be applied to the oxide surface for example by spraying or by application with a roller (depending on the shape of the substrate) or by printing or, preferably, by immersion of the article to be dyed in a dyebath. In one feature of the dyeing process of the invention the anodized metal articles may, following anodic treatment and rinsing, be treated with the dyebath in the same vessel in which anodizing has taken place, or, in a further feature, the articles to be dyed may, following anodic treatment and rinsing, be removed from the vessel and be dyed, either directly or after drying and an optional intermediate storage, in a second unit; if the articles have been stored intermediately, it is recommended to carry out activation (for example, by brief treatment with sulphuric or nitric acid) prior to dyeing. Regarding this point it is noted that intermediate storage—if carried out at all—is preferably for a limited, short period, e.g. less than 1 week, especially ≦2 days. In accordance with generally customary and preferred processes, dyeing takes place directly after anodizing and subsequent rinsing.

Dyeing takes place judiciously at temperatures below the boiling point of the liquor, advantageously at temperatures in the range from 15 to 80° C., preferably in the range from 20 to 75° C., with particular preference, from 20 to 60° C. The pH of the dyeing liquor lies, for example, in the clearly acidic to weakly basic range, for example, in the pH range from 3 to 8, weakly acidic to nearly neutral conditions being preferred, in particular in the pH range from 4 to 6. The dye concentration and the dyeing duration may vary very greatly depending on the substrate and on the desired colouring effect. Suitable dye concentrations are e.g. those in the range from 0.01 to 20 g/l, advantageously from 0.1 to 10 g/l, in particular, from 0.2 to 2 g/l. The dyeing duration may lie, for example, in the range from 20 seconds to 1 hour, advantageously from 5 to 40 minutes, very fine, intense dyeings being obtainable already at a dyeing duration of from 5 to 30 minutes on oxide layers having a thickness in the range from 5 to 25 μm at dye concentrations, pH values and temperatures within the preferred ranges. Since the dyes to be employed in accordance with the invention are highly soluble in water it is also possible to use them to prepare stock solutions or reinforcing liquors of any desired concentration, in order to set or correct the dye concentration in the dyebath to whatever level as required. Owing to their high bath durability and hue constancy even after a plurality of dyeings from one same dyebath, optimal shade reproducibility is possible.

Prior to sealing, the dyed substrate is advantageously rinsed with water. Sealing may be carried out using any known methods conventional per se, optionally with the aid of suitable additives. Sealing may be carried out, for example, in one or two stages; and, if proceeding in two stages, the first stage consists advantageously of treatment with hot water (for example, in the temperature range from 70 to 90° C.). For the second stage (aftersealing or main sealing) or for the single-stage process a sealing may be carried out by boiling, for example with deionized water (for example, at temperatures 24 95° C., at pH values in the range from 5.5 to 6, and for a treatment period of from 30 to 60 minutes) or a steam treatment may be carried out, e.g. at 4 to 6 bar superatmospheric pressure. In accordance with a further procedure sealing may be carried out e.g. at pH values in the range from 4.5 to 8, with the aid of metal salts or oxides (e.g. nickel acetate or cobalt acetate) or also with chromates, in one or two stages. Such sealing with metal compounds (e.g. with nickel acetate) permits particularly effective suppression of dye bleeding. A further procedure operates with the aid of organic sealants, e.g. with organic phosphonates and diphosphonates or also with water-soluble (cyclo)aliphatic polycarboxylic acids or aromatic ortho-hydroxycarboxylic acids (as described, for example, in DE-A-3327191) e.g. at pH values in the range, from 4.5 to 8. The sealants can be employed in very low concentrations: for example, in concentrations from 0.001 to 2 g/l, preferably from 0.002 to 0.1 g/l. The sealing temperature may vary depending on the auxiliary used and on the process chosen; e.g. in the range from 20 to 100° C., for hot sealing e.g. in the range from 60 to 100° C., advantageously from 80 to 100° C., for cold sealing e.g. at temperatures in the range from 20 to 30° C. where nickel salts or cobalt salts may be used in combination with alkali metal fluorides, e.g. NaF, especially also for cold sealing, e.g. at 20–30° C. If desired, the dyed and sealed aluminium oxide layers or aluminium alloy oxide layers may subsequently be coated with, for example, waxes, resins, oils, paraffins or plastics, provided that this coating is transparent.

For setting the ph values in the dyebaths and sealing solutions known additives which are customary per se may be used, e.g. sulphuric acid, acetic acid, ammonia, sodium hydroxide or carbonate, and/or sodium acetate. Optionally or respectively if required, antismut additives and/or surfactants (e.g. wetting agents), especially anionic surfactants such as $C_{9-14}$-alkanesulphonates, mono- or di-alkylbenzenesulphonates in which the alkyl radicals contain a total of 4 to 18 carbon atoms, and oligomeric condensation products of formalde hyde and naphthalenesulphonic acids, may be used.

The dyes of the invention have a very neutral fine grey hue which can e.g. be determined in CIELAB colour space coordinates; e.g. in a solution of such a concentration as corresponds to an absorption of 0.6 cm$^{-1}$ at the absorption maximum, they have a CIELAB colour locus which is advantageously at a lightness $L^*$ within the range from 50 to 70, preferably 56 to 64, and at a chroma $C^* \leq 10$, advantageously within the range from 0 to 8, preferably 0 to 7, in particular 0 to 5.5. They are also notable for excellent dyebath durability. The dyeings obtainable with the dyes of the formula (I) have very fine, nearly neutral, full grey hues and are notable for their high colour yields and reproducibility of the hue and also for their high fastnesses, especially lightfastnesses (including wet lightfastness and weather fastness). In a preferred form, the dye composition is an aqueous concentrated solution or a dry granulate of an asymmetrical 1:2 chromium complex dye of the formula (I), containing $\leq 5\%$, based on pure dye, of inorganic salts.

In the following Examples parts signify parts by weight and percentages signify percentages by weight; temperatures are reported in degrees Celsius. The colour space coordinates and $\lambda_{max}$ values (light absorption maxima) are measured in aqueous, dilute NaOH solution. The colour space coordinates are reported in CIELAB units (lightness=$L^*$, chroma $C^*$, hue=h) at a concentration which corresponds to an absorption of 0.6 cm$^{-1}$ at the absorption maximum. The $\lambda_{max}$ values are the absorption maxima in the yellow ($\lambda_{max.1}$) and blue ($\lambda_{max.2}$) region.

EXAMPLE 1

1a.) Production of the 1:1 chromium complex dye 24.2 g (0.05 mol) of the monoazo dye prepared from diazotized 2-amino-4-nitroplienol-6-sulphonic acid and 2-amino-8-hydroxynaphthalene-6-sulphonic acid are suspended in 300 g of water. The pH is set to 2.2 with hydrochloric acid and 2 g of salicylic acid and 0.05 mol of chromium in the form of chromium(III) sulphate are added. The reaction mixture is heated to the boil and boiled for 24 hours while the pH is maintained at 2.2 with sodium hydroxide solution. On expiration of this period the starting dye has completely disappeared. The 1:1 chromium complex dye is isolated by filtration and washing with water and dried. It is a mixture of the respective monoazo dyelaquo and monoazo dye/salicylic acid/aquo chromium complexes.

1b.) Production of the monoazo dye from 2-amino-1-hydroxybenzene-4-sulphonamide and 2-amino-8-hydroxynaphthalene-6-sulphonic acid 9.4 g (0.05 mol) of 2-amino-1-hydroxybenzene-4-sulphonamide are stirred into 30 ml of water and 10 ml of 30% hydrochloric acid. Whilst cooling, 3.5 g (0.05 mol) of sodium nitrite in 10 ml of water are added dropwise and stirring is continued for one hour, then any nitrite still present is destroyed with a little aminosulphonic acid. 11.95 g (0.05 mol) of 2-amino-8-hydroxynaphthalene-6-sulphonic acid are dissolved in 40 ml of water and 5 ml of sodium hydroxide. Whilst cooling with ice, the above-described diazonium salt suspension is added dropwise whilst the pH is maintained between 8 and 9 with sodium hydroxide solution. The precipitated dye is filtered off, washed with water and dried. In the form of the free acid, it conforms to the formula

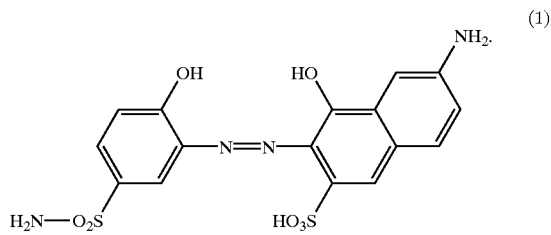

(1)

1c.) Production of the asymmetrical 1:2 chromium complex dye in solution 26.7 g (0.05 mol) of the 1:1 chromium complex dye of 1a.) and 21.9 g of the monoazo dye of 1b.) are suspended in 300 ml of water. The pH-value is set to 8 with sodium hydroxide solution and the mixture is heated to 90° C. After heating at 90° C. for 2 hours, there are no starting materials left.

1d.) Isolation of the synthesized 1:2 chromium complex dye

The dye is precipitated with potassium chloride, filtered and dried. In the form of the free acid, it conforms to the formula

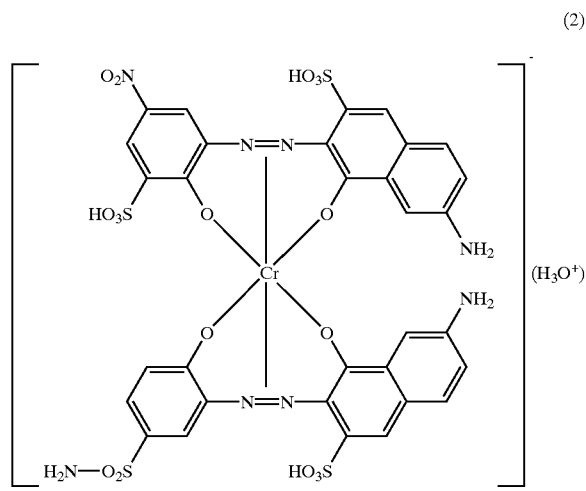

(2)

and is obtained as sodium/potassium salt. It dyes anodized aluminium in neutral grey shades. Lightness ($L^*$): 60.5; chroma ($C^*$): 4.2; hue (h): 37.2°; $\lambda_{max1}$=489.4 nm; $\lambda_{max2}$=578.4 nm.

The dyes listed in the following table, which, in the form of the free acid, conform to the following formula (3):

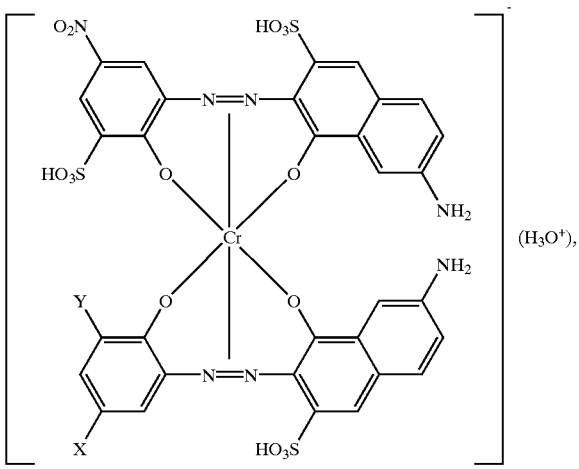

(3)

are produced in analogy to the procedure described in Example 1 and are obtained in analogy to Example 1 in the form of their sodium/potassium salts, and give grey dyeings on anodized aluminium.

TABLE 1

(Examples 2 to 7)

| Ex. No. | X | Y | L* | C* | h | $\lambda_{max1}$ | $\lambda_{max2}$ |
|---|---|---|---|---|---|---|---|
| 2 | —SO₃H | H | 59.7 | 4.6 | 13.5° | 490.3 nm | 577 nm |
| 3 | —SO₃H | —SO₃H | 59.7 | 3.1 | 355.6° | 494.3 nm | 581.8 nm |
| 4 | —SO₂—NH—C₆H₅ | H | 60.0 | 3.9 | 42.6° | 487 nm | 578.4 nm |
| 5 | —SO₂—NH—C₆H₄—COOH | H | 60.4 | 3.9 | 53.5° | 484.1 nm | 578.4 nm |
| 6 | Cl | —SO₃H | 60.5 | 6.0 | 296.2° | 503.6 nm | 578.3 nm |
| 7 | —SO₃H | Cl | 60.4 | 3.4 | 38.9° | 489.5 nm | 580.4 nm |

By corresponding bases for neutralizing and corresponding salts for precipitation, the dyes of Examples 1–7 may also be obtained in the form of their ammonium and/or lithium salts. By acidification, for example with sulphuric acid, filtration and neutralization of the acidified dye with triethanolamine, the dyes can also be obtained in the corresponding amine salt form.

Dye Solution 1 (production of a concentrated dye solution of very low salt content)

After proceeding as described in Example 1a.) to 1c.), the reaction solution is adjusted to pH 7 and dialysed though a membrane at 40 to 50° C. and a pressure of 20 to 30 bar, A dialysis factor of 2–3 is used, and an almost salt-free solution is obtained. The solution is then concentrated under the same dialysis conditions. A storage-stable, concentrated solution of very low salt content, containing 20% of pure dye and ≦1%, of mineral salts is obtained. It dyes aluminium oxide layers in grey shades.

Dye Solutions 2 to 7

The procedure is carried out as described for Dye Solution 1, with the difference that instead of the reaction solution from the production of the 1:2 chromium complex dye of Example 1, there are employed those of the production of the 1:2 chromium complex dyes of Examples 2 to 7.

Application Example A

A degreased and deoxidized workpiece of pure aluminium sheet is anodically oxidized in an aqueous solution which comprises sulphuric acid and aluminium sulphate in a concentration of from 17 to 22% sulphuric acid and from 0.5 to 1.5% aluminium ions, at a temperature of from 18 to 20° C., at a voltage of from 15 to 17 volts with direct current having a density of 1.5 A/dm², for 30 minutes. An oxide layer 12–15 μm thick is formed. After rinsing with water, the aluminium sheet workpiece is dyed for 20 minutes at 20–25° C. in a dyebath containing in 1000 parts of deionized water 0.5 part of the 1:2 chromium complex dye produced in Example 1, at a pH of from 5.5 to 5.7 (set with acetic acid and sodium acetate). The dyed workpiece is rinsed with water and then sealed in deionized water at from 98 to 100° C. for 40 minutes. To prevent the formation of any disruptive deposit during sealing, an antismut agent may be added to the deionized water that is employed for sealing. A workpiece dyed grey in a high colour yield is obtained, which is notable for its good hue constancy and reproducibility, even after repeated bath exhaustions, and also for its light fastness (light fastness =7–8) and weather fastness.

Application Example B

The procedure described in Application Example A is repeated with the difference that the sealing is carried out with a solution containing 3 parts of nickel acetate in combination with 0.5 part of oligomeric condensation product of naphthalenesulphonic acid and formaldehyde in 1000 parts of water. A grey dying of high colour yield and hue reproducibility and also good light and weather fastness is obtained.

Application Example C

The procedure described in Application Example B is repeated with the difference that the dyeing is carried out for 15 minutes at 60° C. instead of 20 minutes at 20–25° C. A grey dyeing of high colour yield and hue reproducibility and also of good light and weather fastness is obtained.

Application Example D

The procedure described in Application Example A is repeated with the difference that the anodization is carried out for 55 minutes instead of 20 minutes to give an oxide layer of 20–25 μm thickness. A dark ("anthracite") grey dyeing of high colour yield and hue reproducibility and also of high light fastness (light fastness ≧10) and weather fastness is obtained.

Application Example E 10 parts of the dye of Example 1 are dissolved in 500 parts of water and stirred into a highly viscous solution consisting of 400 parts of water and 100 parts of methylcellulose having an average degree of polymerization and a degree of substitution of 1.5. The printing ink thus obtained is screen printed onto a dry, oxidized aluminium sheet which was obtained by anodizing an aluminium alloy of the type AVMg/Si 0.5 in an aqueous sulphuric acid and aluminium sulphate solution of a sulphuric acid concentration of 17 to 22% and an aluminium ion concentration of 0.5 to 1.5%, at a temperature of 18 to 20° C., at a voltage of 15 to 17 volts, with direct current of a density of 1.5 A/dm$^2$, during 30 minutes. The printed sheet is immersed in boiling water for 40–50 minutes and thoroughly rinsed in cold water. This produces a dark grey pattern on an uncoloured metallic ground of the self-colour of the anodized aluminium alloy.

Application Example F

The procedure described in Application Example E is repeated, with the difference that the sealing is carried out with a solution containing 3 parts of nickel acetate combined with 0.5 part of oligomeric condensation product of naphthalenesulphonic acid and formaldehyde in 1000 parts of water.

Analogously to the dye according to Example 1, the dyes from each of Examples 2 to 7 are employed in Application Examples A, B, C, D, E and F. Grey dyeings or prints which are notable for their light and weather fastnesses and where the dyeings are notable for their hue constancy and reproducibility, even after repeated bath exhaustions, are obtained in each case. Dye solutions 1 to 7 are employed in the same way.

The lightfastness may be determined according to ISO standards, for example according to ISO standard no. 2135-1984 by dry exposure of a sample in exposure cycles of 200 hours each of exposure to standard light in an Atlas Weather-O-meter 65 WRC, which is equipped with a xenon arc lamp, or according to ISO standard No. 105 B02 (USA) by dry exposure of a sample in exposure cycles of 100 hours each of exposure to standard light in an Atlas Weather-O-meter Ci 35 A, which is equipped with a xenon arc lamp, and comparison of the exposed samples with a rating pattern of lightfastness rating =6 on the blue scale (corresponding to about rating 3 on the grey scale) or directly with the blue scale rating pattern of rating 6.

What is claimed is:

1. Asymmetrical 1:2 chromium complex dyes of the formula

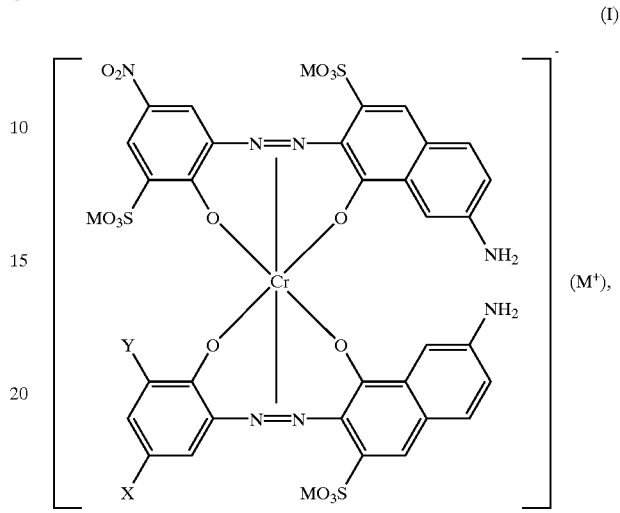

wherein

X signifies —SO$_3$M, —SO$_2$NR$_1$R$_2$ or chlorine,

Y signifies hydrogen, —SO$_3$M or chlorine,

R$_1$ signifies hydrogen, C$_{1-6}$-alkyl, C$_{2-3}$-hydroxyalkyl or a radical of the formula

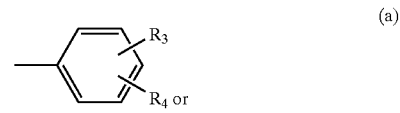

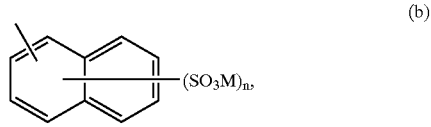

R$_2$ signifies hydrogen, C$_{1-6}$alkyl or C$_{2-3}$-hydroxyalkyl, or R$_1$ and R$_2$ together with the nitrogen atom to which they are attached form a 5- or 6-membered saturated heterocycle, R$_3$ signifies hydrogen, C$_{1-2}$-alkyl, chlorine, —COOM or —SO$_3$M, R$_4$ signifies hydrogen, C$_{1-2}$-alkyl, C$_{1-2}$-alkoxy, chlorine or —SO$_3$M, n signifies from 0 to 3, M signifies in each case hydrogen or a non-chromophoric cation, and M$^+$ signifies hydrogen or a non-chromophoric cation.

2. Process for production of asymmetrical 1:2 metal complex dyes according to claim 1, wherein a 1:1 chromium complex of a monoazo compound of the formula

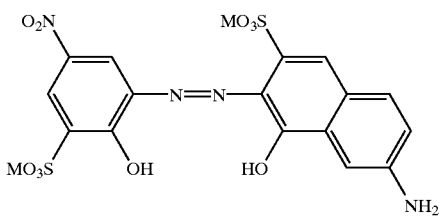

is reacted with a metallizable compound of the formula

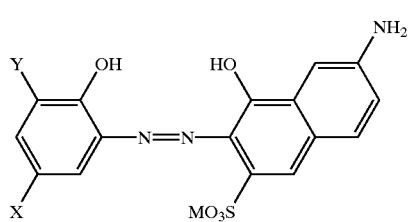

or a 1:1 chromium complex of a monoazo compound of the formula (III) is reacted with a metallizable compound of the formula (II).

3. The asymmetrical 1:2 chromium complex dyes obtained by the process according to claim 2.

4. Dye composition comprising at least one asymmetrical 1:2 chromium complex dye according to claim 1.

5. Dye composition comprising an asymmetrical 1:2 chromium complex dye of the formula (I) according to claim 1 and at least one compound selected from the group consisting of blending agents and additives.

6. Dye composition comprising an aqueous concentrated solution or a dry granulate of an asymmetrical 1:2 chromium complex dye of the formula (I) according to claim 1, and containing <5%, based on pure dye, of inorganic salts.

7. A dyed oxide layer on aluminum or aluminum alloys comprising the asymmetrical 1:2 chromium complex dyes of claim 1.

8. A process for dyeing an artificially produced oxide layer on metal comprising the steps of providing a dyebath having a dye including the asymmetrical 1:2 chromium complex dyes of claim 1, and dyeing the oxide layer by immersing the metal in the dyebath, wherein the metal is selected from the group consisting of anodized aluminum and anodized aluminum alloys.

9. The process of claim 8, further comprising the step of sealing the oxide layer subsequent to the dyeing step.

10. The oxide layer dyed by the process according to claim 8.

11. The process of claim 8, further comprising the step of reinforcing the dyebath with the dye.

\* \* \* \* \*